US012436862B2

(12) United States Patent
Suetsugu

(10) Patent No.: US 12,436,862 B2
(45) Date of Patent: **\*Oct. 7, 2025**

(54) INAPPROPRIATE USE CONTROL SYSTEM AND INAPPROPRIATE USE CONTROL PROGRAM

(71) Applicant: Katsunori Suetsugu, Tokyo (JP)

(72) Inventor: Katsunori Suetsugu, Tokyo (JP)

(\*) Notice: Subject to any disclaimer, the term of this patent is extended or adjusted under 35 U.S.C. 154(b) by 15 days.

This patent is subject to a terminal disclaimer.

(21) Appl. No.: 18/521,257

(22) Filed: Nov. 28, 2023

(65) Prior Publication Data

US 2024/0095144 A1   Mar. 21, 2024

Related U.S. Application Data

(63) Continuation of application No. 17/873,307, filed on Jul. 26, 2022, now Pat. No. 11,886,317.

(30) Foreign Application Priority Data

Jul. 30, 2021 (JP) .................................. 2021-125318

(51) Int. Cl.
*G06F 11/34* (2006.01)
*G06F 11/30* (2006.01)
*H04L 67/50* (2022.01)

(52) U.S. Cl.
CPC ...... *G06F 11/3438* (2013.01); *G06F 11/3058* (2013.01); *H04L 67/535* (2022.05)

(58) Field of Classification Search
CPC .......... G06F 11/3438; G06F 11/3058; H04W 4/027; H04L 67/535
See application file for complete search history.

(56) References Cited

U.S. PATENT DOCUMENTS

| 7,353,536 | B1 | 4/2008 | Morris et al. |
| 8,884,750 | B2* | 11/2014 | Bacal ...................... B60Q 1/00 |
| | | | 340/439 |
| 8,898,771 | B1 | 11/2014 | Kim et al. |
| 8,938,256 | B2 | 1/2015 | Logan |
| 9,386,463 | B1* | 7/2016 | Contino ................ H04W 12/00 |
| 9,919,648 | B1 | 3/2018 | Pedersen |

(Continued)

FOREIGN PATENT DOCUMENTS

| CN | 111079513 A | 4/2020 |
| JP | 2004-179728 A | 6/2004 |

(Continued)

OTHER PUBLICATIONS

Notice of Reasons for Refusal dated Nov. 10, 2021, issued in counterpart JP Application No. 2021-125318, with machine translation (12 pages).

(Continued)

*Primary Examiner* — David R Lazaro
(74) *Attorney, Agent, or Firm* — WHDA, LLP

(57) ABSTRACT

When a current situation corresponds to at least one of action determination conditions as conditions for determining a curbing action as an action for curbing inappropriate use of an electronic device carried and used by a user, the electronic device determines the curbing action according to the action determination condition to which the current situation corresponds, and executes the determined curbing action.

12 Claims, 13 Drawing Sheets

(56) References Cited

U.S. PATENT DOCUMENTS

| | | | |
|---|---|---|---|
| 10,805,801 B1* | 10/2020 | Onyekwelu | H04W 24/08 |
| 11,886,317 B2* | 1/2024 | Suetsugu | G06F 11/3438 |
| 2008/0027337 A1 | 1/2008 | Dugan et al. | |
| 2009/0201125 A1 | 8/2009 | Ikeguchi et al. | |
| 2010/0057781 A1 | 3/2010 | Stohr | |
| 2010/0160004 A1* | 6/2010 | Alameh | G06F 1/1698 |
| | | | 455/575.1 |
| 2010/0194578 A1 | 8/2010 | Zhang | |
| 2010/0297930 A1 | 11/2010 | Harris | |
| 2011/0264246 A1 | 10/2011 | Pantoja et al. | |
| 2012/0071151 A1 | 3/2012 | Abramson et al. | |
| 2012/0253552 A1 | 10/2012 | Skelton | |
| 2014/0302834 A1* | 10/2014 | Jones | H04W 4/027 |
| | | | 455/418 |
| 2014/0315531 A1* | 10/2014 | Joong | H04M 1/72463 |
| | | | 455/26.1 |
| 2014/0342725 A1 | 11/2014 | Taylor | |
| 2014/0359777 A1* | 12/2014 | Lam | G06F 21/577 |
| | | | 726/25 |
| 2015/0025917 A1 | 1/2015 | Stempora | |
| 2015/0054934 A1* | 2/2015 | Haley | B60W 50/12 |
| | | | 348/78 |
| 2015/0094118 A1 | 4/2015 | Rodolico | |
| 2015/0382155 A1 | 12/2015 | Ulliman et al. | |
| 2016/0101784 A1* | 4/2016 | Olson | B60K 35/28 |
| | | | 340/576 |
| 2016/0292988 A1* | 10/2016 | McCleary | G08B 21/0446 |
| 2017/0294139 A1* | 10/2017 | Cordova | H04M 1/724 |
| 2017/0310816 A1* | 10/2017 | Rhyne | H04M 1/72457 |
| 2018/0204437 A1 | 7/2018 | Singh et al. | |
| 2019/0037078 A1 | 1/2019 | Kim et al. | |
| 2019/0054955 A1 | 2/2019 | Kalabic et al. | |
| 2019/0156191 A1* | 5/2019 | Cordes | G08B 21/182 |
| 2019/0205816 A1 | 7/2019 | Sakurada et al. | |
| 2020/0092245 A1* | 3/2020 | Hewitt | H04L 51/226 |
| 2020/0225799 A1 | 7/2020 | Marra | |
| 2020/0371601 A1 | 11/2020 | Iio et al. | |
| 2021/0063179 A1 | 3/2021 | Hayes et al. | |
| 2021/0126809 A1* | 4/2021 | Fan | H04L 43/16 |
| 2021/0350034 A1* | 11/2021 | Delaney | G06F 21/552 |
| 2023/0027582 A1* | 1/2023 | Meidan | G01S 5/06 |
| 2023/0033239 A1* | 2/2023 | Suetsugu | G06F 11/3058 |
| 2024/0095144 A1* | 3/2024 | Suetsugu | G06F 11/3438 |

FOREIGN PATENT DOCUMENTS

| | | |
|---|---|---|
| JP | 2009140165 A | 6/2009 |
| JP | 2009-268034 A | 11/2009 |
| JP | 2010-199754 A | 9/2010 |
| JP | 2013-069286 A | 4/2013 |
| JP | 2013-207406 A | 10/2013 |
| JP | 2013-239208 A | 11/2013 |
| JP | 2014-211787 A | 11/2014 |
| JP | 2015-082814 A | 4/2015 |
| JP | 2015-215696 A | 12/2015 |
| JP | 2015-216464 A | 12/2015 |
| JP | 2017-183783 A | 10/2017 |
| JP | 2019-057002 A | 4/2019 |
| JP | 2020-198605 A | 12/2020 |
| JP | 2021-057069 A | 4/2021 |
| WO | 2017/154208 A1 | 9/2017 |

OTHER PUBLICATIONS

Notice of Reasons for Refusal dated Mar. 16, 2022, issued in counterpart JP Application No. 2021-125318, with machine translation (22 pages).

Office Action dated Jan. 11, 2023, issued in counterpart JP Application No. 2022-079981, with English translation. (6 pages).

Office Action dated Jun. 7, 2023, issued in counterpart Application No. 2023-036784, with English translation. (8 pages).

* cited by examiner

FIG.3

19d ACTION DETERMINATION CONDITION TABLE

| ACTION DETERMINATION CONDITION | | NUMERICAL VALUE |
|---|---|---|
| POSTURE OF USER | SITTING | −100 |
| | STANDING | 5 |
| | ⋮ | ⋮ |
| MOVEMENT OF USER | WALKING | 10 |
| | RUNNING | 60 |
| | MOVING IN ZIGZAG BY FOOT | 5 |
| | SUDDENLY STOPPING FREQUENTLY WHILE MOVING BY FOOT | 5 |
| | MOVING LATERALLY FREQUENTLY WHILE MOVING BY FOOT | 5 |
| | JUMPING WHILE MOVING BY FOOT | 5 |
| | STOPPING FREQUENTLY WHILE MOVING BY FOOT | 5 |
| | GOING BACK AND FORTH WHILE MOVING BY FOOT | 5 |
| | ⋮ | ⋮ |
| | MOVING BY TRAIN | 5 |
| | MOVING BY AUTOMOBILE | 20 |
| | ⋮ | ⋮ |
| DEGREE OF CONCENTRATION ON OPERATION | SLIGHTLY CONCENTRATED | 5 |
| | CONSIDERABLY CONCENTRATED | 10 |
| | ⋮ | ⋮ |
| ERRONEOUS OPERATION | FREQUENT | 10 |
| | ⋮ | ⋮ |
| USER LOCATION | HOME | 1 |
| | WORKPLACE | 2 |
| | INSIDE BUILDING | 3 |
| | ⋮ | ⋮ |
| | NEAR HOME | 4 |
| | NEAR WORKPLACE | 5 |
| | PARK | 5 |
| | COMMERCIAL AREA | 10 |
| | EVENT VENUE | 10 |
| | TERMINAL STATION | 20 |
| | SUBURB | 5 |
| | ⋮ | ⋮ |
| | REGION WITH BAD ROADS | 10 |
| | REGION WITH MANY PEOPLE | 10 |
| | REGION WITH MANY VEHICLES | 20 |
| | REGION WITH MANY ANIMALS | 10 |
| | REGION WITH MANY STATIONARY OBJECTS | 10 |
| | ⋮ | ⋮ |
| WEATHER | RAIN | 10 |
| | STRONG WIND | 10 |
| | ⋮ | ⋮ |
| PURPOSE OF MOVEMENT | PRESENT | 20 |
| OPERATION CONCENTRATION MODE | SET | −50 |

FIG.4

19e CURBING ACTION TABLE

| CURBING LEVEL | CONTENT OF CURBING ACTION | NUMERICAL RANGE |
|---|---|---|
| LEVEL 0 | | LESS THAN 10 |
| LEVEL 1 | LEVEL 1 NOTIFICATION<br>PROHIBITION OF SOME IMAGE OPERATIONS | 10 OR MORE AND LESS THAN 20 |
| LEVEL 2 | LEVEL 2 NOTIFICATION<br>PROHIBITION OF IMAGE OPERATION<br>PROHIBITION OF DISPLAY OF SOME IMAGES | 20 OR MORE AND LESS THAN 30 |
| LEVEL 3 | LEVEL 3 NOTIFICATION<br>PROHIBITION OF IMAGE OPERATION<br>PROHIBITION OF DISPLAY OF SOME IMAGES<br>PROHIBITION OF PART OF AUDIO OUTPUT<br>PROHIBITION OF AUDIO INPUT | 30 OR MORE |

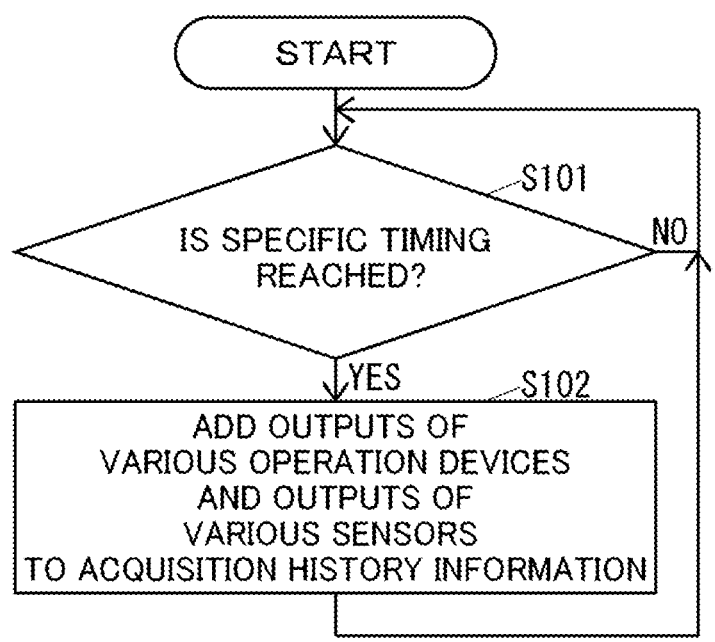

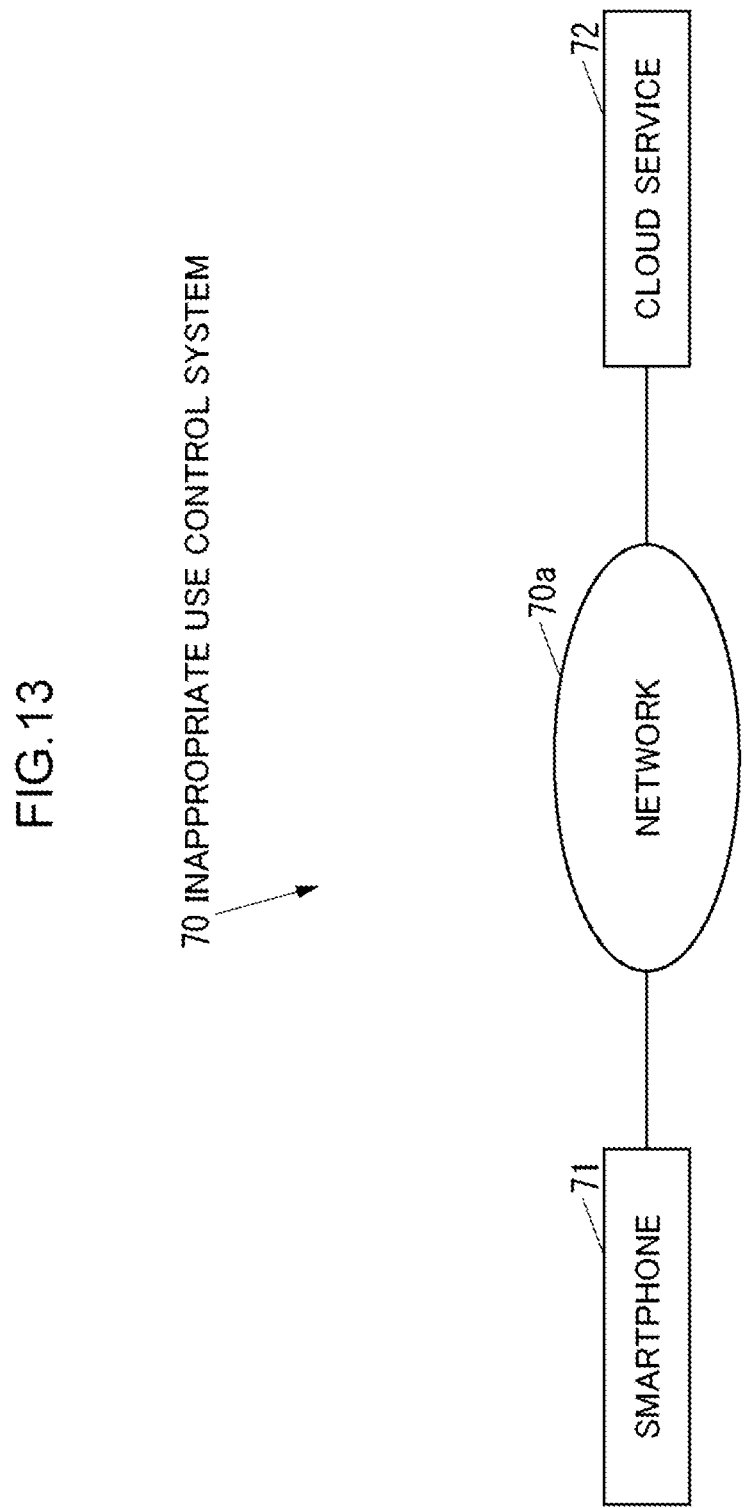

INAPPROPRIATE USE CONTROL SYSTEM AND INAPPROPRIATE USE CONTROL PROGRAM

CROSS REFERENCE TO RELATED APPLICATION

This application is a continuation of U.S. application Ser. No. 17/873,307, filed on Jul. 26, 2022, which is based upon and claims the benefit of priority from Japanese Patent Application No. 2021-125318 filed Jul. 30, 2021, the entire contents of which are incorporated herein by reference.

BACKGROUND OF THE INVENTION

1. Technical Field

The present invention relates to an inappropriate use control system and an inappropriate use control program for curbing a user's inappropriate use of an electronic device carried by the user and used by the user.

2. Description of the Related Art

Conventionally, an electronic device carried by a user and used by the user has been known (see JP 2020-198605 A, for example).

SUMMARY OF THE INVENTION

However, in the conventional electronic device, there is a problem that inappropriate use such as so-called "smartphone zombie (operation of smartphone while walking)" is performed by the user.

Against this background, an object of the present invention is to provide an inappropriate use control system and an inappropriate use control program capable of curbing a user's inappropriate use of an electronic device owned by the user.

An inappropriate use control system according to the present invention includes a curbing action determination unit that determines a curbing action as an action for curbing a user's inappropriate use of an electronic device carried by the user and used by the user, and a curbing action execution unit that executes the curbing action determined by the curbing action determination unit. When a current situation corresponds to at least one of action determination conditions as conditions for determining the curbing action, the curbing action determination unit determines the curbing action according to the action determination condition to which the current situation corresponds.

According to this configuration, when the current situation corresponds to at least one of the action determination conditions, the inappropriate use control system of the present invention determines the curbing action according to the action determination condition to which the current situation corresponds. Therefore, it is possible to curb inappropriate use of the electronic device by the user.

In the inappropriate use control system of the present invention, the curbing action may include a notification to the user.

With this configuration, the inappropriate use control system of the present invention curbs inappropriate use of the electronic device by the user of the electronic device by notifying the user of the electronic device. Therefore, it is possible to prompt the user of the electronic device not to use the electronic device inappropriately.

In the inappropriate use control system of the present invention, the curbing action may include use restriction of the electronic device.

With this configuration, the inappropriate use control system of the present invention curbs inappropriate use of the electronic device by the user of the electronic device by use restriction of the electronic device. Therefore, it is possible to effectively curb inappropriate use of the electronic device by the user.

In the inappropriate use control system of the present invention, as the action determination condition, there may be at least one of a condition related to a state of a posture of the user, a condition related to a state of movement of the user, a condition related to a degree of concentration on operation of the electronic device by the user, a condition related to a state of erroneous operation of the electronic device by the user, a condition related to a location of the user, a condition related to the weather of a place where the user is present, a condition related to whether or not there is a purpose of movement of the user, and a condition related to whether or not the electronic device is set to a mode in which the user concentrates on an operation of the electronic device.

With this configuration, the inappropriate use control system of the present invention can execute an appropriate curbing action. Therefore, it is possible to appropriately curb inappropriate use of the electronic device by the user.

In the inappropriate use control system of the present invention, the curbing action execution unit may permit exceptional use of a specific function of the electronic device in a specific situation when executing the curbing action.

With this configuration, the inappropriate use control system of the present invention permits exceptional use of a specific function of the electronic device in a specific situation when executing the curbing action. Therefore, it is possible to reduce adverse effects associated with curbing inappropriate use of the electronic device by the user.

An inappropriate use control program according to the present invention causes an electronic device carried by a user and used by the user to implement a curbing action determination unit that determines a curbing action as an action for curbing the user's inappropriate use of the electronic device, and a curbing action execution unit that executes the curbing action determined by the curbing action determination unit. When a current situation corresponds to at least one of action determination conditions as conditions for determining the curbing action, the curbing action determination unit determines the curbing action according to the action determination condition to which the current situation corresponds.

With this configuration, when the current situation corresponds to at least one of the action determination conditions, the electronic device that executes the inappropriate use control program of the present invention determines the curbing action according to the action determination condition to which the current situation corresponds. Therefore, it is possible to curb inappropriate use of the electronic device by the user of the electronic device.

The inappropriate use control system and the inappropriate use control program of the present invention can curb the user's inappropriate use of the electronic device owned by the user.

BRIEF DESCRIPTION OF THE DRAWINGS

FIG. 3 is a diagram illustrating an example of an action determination condition table illustrated in FIG. 2;

FIG. 4 is a diagram illustrating an example of a curbing action table illustrated in FIG. 2;

FIG. 5 is a flowchart of an example of the operation of the smartphone illustrated in FIG. 2 in a case of updating acquisition history information;

FIG. 13 is a block diagram illustrating an example different from the example illustrated in FIG. 2 of the inappropriate use control system according to the embodiment of the present invention.

DETAILED DESCRIPTION

Hereinafter, an embodiment of the present invention will be described with reference to the drawings.

First, a configuration of a smartphone as an electronic device according to an embodiment of the present invention will be described.

Figure 1A:
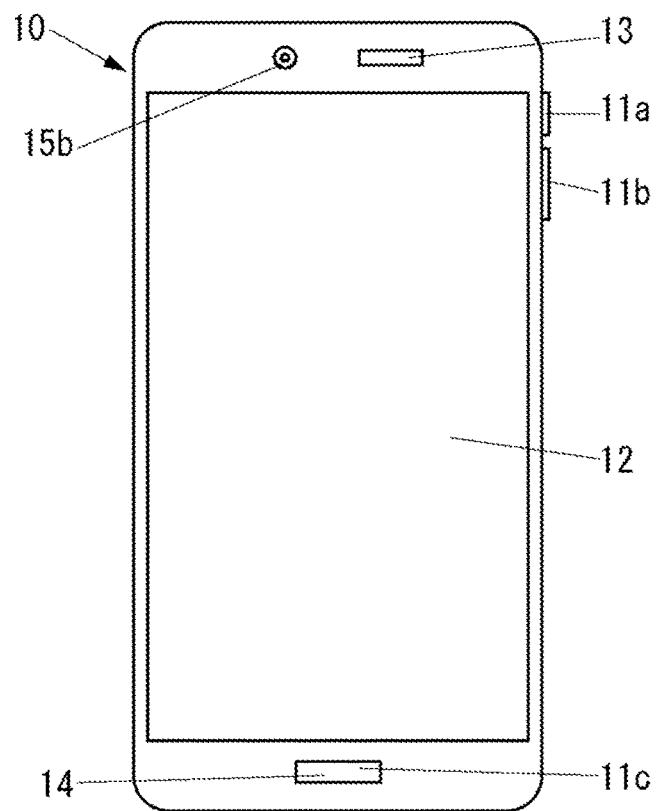
FIG. 1A is a front view of a smartphone according to an embodiment of the present invention.
Figure 1B:
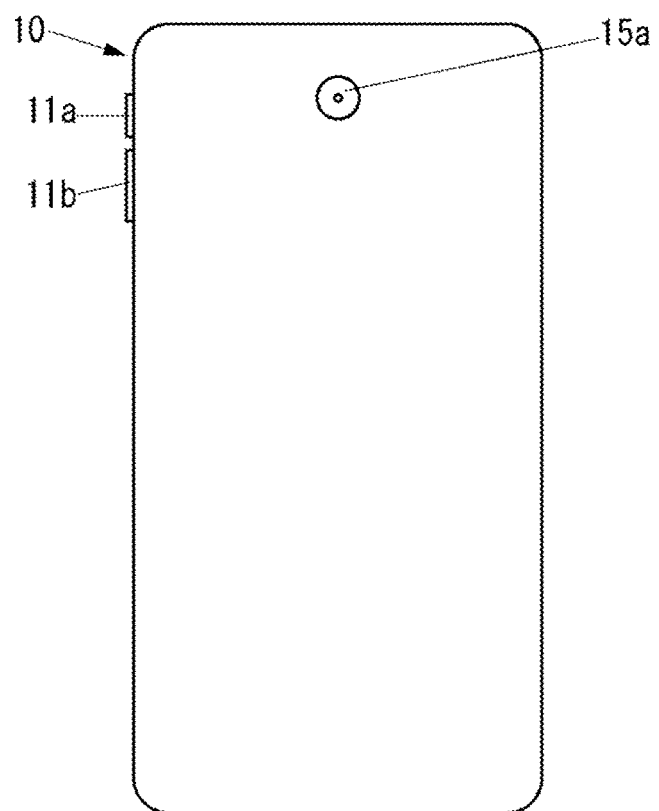
FIG. 1B is a back view of the smartphone illustrated in FIG. 1A.
Figure 2:
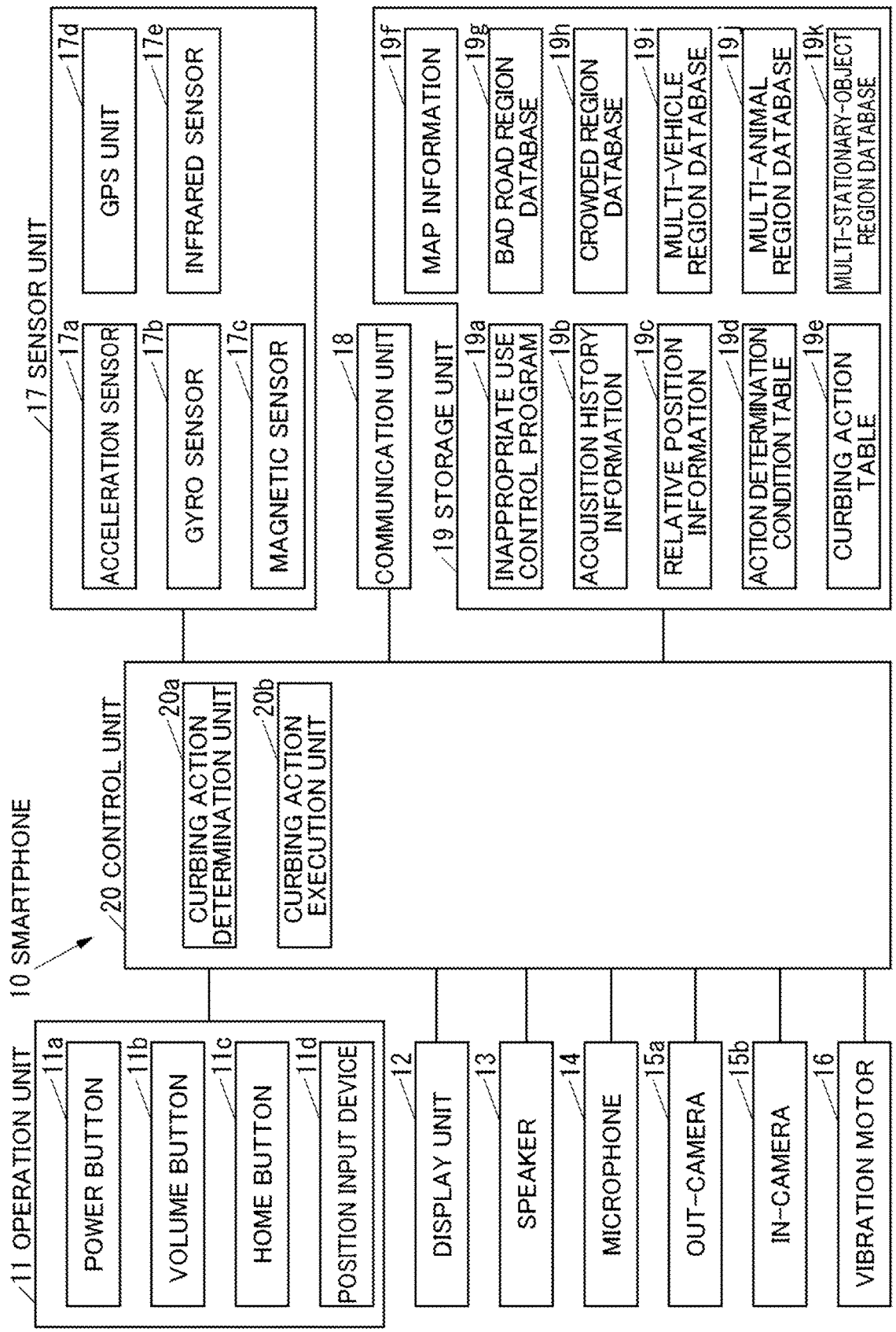
FIG. 2 is a block diagram illustrating a configuration of the smartphone illustrated in FIG. 1.

FIG. 1A is a front view of a smartphone 10 as an electronic device according to the present embodiment. FIG. 1B is a back view of the smartphone 10. FIG. 2 is a block diagram illustrating a configuration of the smartphone 10.

As illustrated in FIGS. 1 and 2, the smartphone 10 includes: an operation unit 11 to which various operations are input; a display unit 12 which is a display device such as an organic electro luminescence (EL) display that displays various information; a speaker 13 that outputs sound; a microphone 14 that inputs sound; an out-camera 15a for capturing an image on a back side of the smartphone 10; an in-camera 15b for capturing an image on a front side of the smartphone 10; a vibration motor 16 for implementing a vibration function; a sensor unit 17 that detects various information; a communication unit 18 which is a communication device that communicates with an external device via a network such as a local area network (LAN) or the Internet or directly communicates with an external device in a wired or wireless manner without a network; a storage unit 19 which is a nonvolatile storage device such as a semiconductor memory that stores various information; and a control unit 20 that controls the entire smartphone 10.

The operation unit 11 includes various operation devices. For example, the operation unit 11 includes, as operation devices, a power button 11a for turning on the power of the smartphone 10, a volume button 11b for adjusting the volume of sound output from the speaker 13, a home button 11c for displaying, for example, a home screen on the display unit 12, and a position input device 11d included in a touch panel together with the display unit 12.

The sensor unit 17 includes various sensors. For example, the sensor unit 17 includes, as sensors, an acceleration sensor 17a that detects acceleration, a gyro sensor 17b that detects angular velocity, a magnetic sensor 17c that detects a magnitude and a direction of a magnetic field, a global positioning system (GPS) unit 17d that detects a current position, and an infrared sensor 17e that detects irregularities of a face of a user of the smartphone 10 (hereinafter simply referred to as "user").

The storage unit 19 stores an inappropriate use control program 19a for curbing inappropriate use of the smartphone 10 by the user. For example, the inappropriate use control program 19a may be installed in the smartphone 10 at the manufacturing stage of the smartphone 10, or may be additionally installed in the smartphone 10 from a network.

The storage unit 19 can store acquisition history information 19b indicating a history of outputs of various operation devices of the operation unit 11 and outputs of various sensors of the sensor unit 17.

In order to determine a state of a posture of the user, that is, whether the user is sitting or standing, the storage unit 19 can store relative position information 19c for posture determination indicating the position of the smartphone 10 carried by a sitting user relative to the position of the smartphone 10 carried by a standing user.

The storage unit 19 can store an action determination condition table 19d indicating a condition (hereinafter referred to as "action determination condition") for determining an action (hereinafter referred to as "curbing action") for curbing inappropriate use of the smartphone 10 by the user.

FIG. 3 is a diagram illustrating an example of the action determination condition table 19d.

As illustrated in FIG. 3, the action determination condition table 19d includes various action determination conditions and numerical values associated with each of these action determination conditions. For example, the types of the action determination condition include "posture of user" indicating the state of the posture of the user, "movement of user" indicating a state of movement of the user, "degree of concentration on operation" indicating the degree of concentration on the operation of the smartphone 10 by the user, "erroneous operation" indicating a state of erroneous operation of the smartphone 10 by the user, "user location", "weather" indicating the weather of the place where the user is present, "purpose of movement" indicating whether or not there is a purpose of movement of the user, and "operation concentration mode" indicating whether the smartphone 10 is set to an operation concentration mode as a mode in which the user concentrates on the operation of the smartphone 10. Each piece of information in the action determination condition table 19d illustrated in FIG. 3 is merely an example. For example, a curbing action determination unit 20a to be described later may change each piece of information in the action determination condition table 19d according to an instruction from the operation unit 11.

"Posture of user" in the action determination condition table 19d includes, for example, an action determination condition "sitting" and an action determination condition "standing".

"Movement of user" in the action determination condition table 19d includes various action determination conditions such as "walking" indicating that the user is moving at a low speed by foot, and "running" indicating that the user is moving at a high speed by foot, for example.

"Degree of concentration on operation" in the action determination condition table 19d includes various action determination conditions such as "slightly concentrated" and "considerably concentrated", for example.

"Erroneous operation" in the action determination condition table 19d includes various action determination conditions such as "frequent", for example.

"User location" in the action determination condition table 19d includes various action determination conditions such as "home", "workplace", "near home", "near workplace", "region with bad roads", "region with many vehicles", "region with many animals", and "region with many stationary objects", for example. Here, "near home" indicates a region within a range of a specific distance from "home". Similarly, "near workplace" indicates a region within a range of a specific distance from "workplace". "Region with bad roads" is, for example, a region with many bad roads such as uneven roads and narrow roads. "Vehicle" in the present embodiment, such as "vehicle" in "region with many vehicles", is a vehicle that causes danger such as collision for the user, such as an automobile, a bicycle, a wheelchair, and a stroller. "Animal" in the present embodiment, such as "animal" in "region with many animals", is an animal that causes danger such as collision, stumbling, or the like for a user, such as a dog, a cat, a crow, a sparrow, and a mouse. "Stationary object" in the present embodiment, such as "stationary object" in "region with many stationary objects", is a stationary object that causes danger such as collision, stumbling, falling, or the like for a user, such as a utility pole, a standing signboard, a mailbox, a guard rail, a step, and a groove.

The action determination conditions of "user location" illustrated in FIG. 3 are merely an example. For example, "user location" may include "school". "User location" illustrated in FIG. 3 includes comprehensive action determination conditions such as "inside building", "park", "commercial area", "event venue", "terminal station", and "suburb". "User location" may include more specific action determination conditions. For example, the "user location" may include a specific action determination condition such as "Yoyogi park" instead of "park".

The user may register various information regarding "home". The various information regarding "home" may include whether or not the place is a structurally dangerous place such as with many steps or complicated passages, whether or not the place has a large number of people per unit area, and whether or not the user is familiar with the place. In the action determination condition table 19d, the numerical value associated with "home" may be set by the curbing action determination unit 20a to be described later on the basis of the various information regarding "home" registered by the user. The same applies to the numerical value associated with "workplace". The user may register various information regarding a specific action determination condition such as "Yoyogi park". Similar to the numerical value associated with "home" and the numerical value associated with "workplace", the numerical value associated with the specific action determination condition may be set by the curbing action determination unit 20a to be described later on the basis of the various information regarding the specific action determination condition registered by the user. Note that in a case where the place is structurally dangerous, a case where the place has a large number of people per unit area, or a case where the user is not familiar with the place, the associated numerical value increases.

"Weather" in the action determination condition table 19d includes various action determination conditions such as "rain" and "strong wind", for example. The action determination conditions of "weather" illustrated in FIG. 3 are merely an example. For example, while "weather" illustrated in FIG. 3 includes a comprehensive action determination condition "rain", the action determination condition may be included for each intensity of rain.

As illustrated in FIG. 2, the storage unit 19 can store a curbing action table 19e indicating a curbing action for each degree of curbing (hereinafter referred to as "curbing level") of inappropriate use of the smartphone 10 by the user.

FIG. 4 is a diagram illustrating an example of the curbing action table 19e.

As illustrated in FIG. 4, in the curbing action table 19e, the curbing level, the content of the curbing action, and the numerical range are associated with each other. Each piece of information in the curbing action table 19e illustrated in FIG. 4 is merely an example. For example, the curbing action determination unit 20a to be described later may change each piece of information in the curbing action table 19e according to an instruction from the operation unit 11.

Each of "level 1 notification", "level 2 notification", and "level 3 notification" illustrated in FIG. 4 is a notification to the user achieved by at least one of display by the display unit 12, audio output by the speaker 13, and vibration by the vibration motor 16.

"Prohibition of some image operations", "prohibition of image operation", "prohibition of display of some images", "prohibition of part of audio output", and "prohibition of audio input" illustrated in FIG. 4 are use restrictions on the smartphone 10. "Prohibition of some image operations" means to prohibit operations on specific images such as a specific button displayed on the display unit 12. "Prohibition of image operation" means to prohibit any operation on the image displayed on the display unit 12. "Prohibition of display of some images" means to prohibit display of specific images such as a moving image in a moving image application on the display unit 12. "Prohibition of part of audio output" means to prohibit output of specific sounds from the speaker 13. "Prohibition of audio input" means to prohibit audio input from the microphone 14.

As illustrated in FIG. 2, the storage unit 19 can store map information 19f.

The storage unit 19 can store a bad road region database 19g indicating regions with bad roads.

The storage unit 19 can store a crowded region database 19h indicating regions with many people for each time zone. For example, the crowded region database 19h includes regions such as a specific event venue and a specific terminal station.

The storage unit 19 can store a multi-vehicle region database 19i indicating regions with many vehicles for each time zone.

The storage unit 19 can store a multi-animal region database 19j indicating regions with many animals for each time zone. For example, the multi-animal region database 19j includes regions such as a specific dog run and a specific place well-known as a place for walking a dog.

The storage unit 19 can store a multi-stationary-object region database 19k indicating regions with many stationary objects for each time zone.

The control unit 20 includes, for example, a central processing unit (CPU), a read only memory (ROM) that stores programs and various data, and a random access memory (RAM) as a memory used as a work area of the CPU of the control unit 20. The CPU of the control unit 20 executes a program stored in the storage unit 19 or the ROM of the control unit 20.

The control unit 20 executes the inappropriate use control program 19a to implement the curbing action determination unit 20a that determines a curbing action and a curbing action execution unit 20b that executes the curbing action determined by the curbing action determination unit 20a. That is, the smartphone 10 forms an inappropriate use control system.

Next, the operation of the smartphone 10 will be described.

First, an example of the operation of the smartphone 10 in a case of updating the acquisition history information 19b will be described.

FIG. 5 is a flowchart illustrating an example of the operation of the smartphone 10 in a case of updating the acquisition history information 19b.

The curbing action determination unit 20a executes the operation illustrated in FIG. 5 when the user logs in to the smartphone 10. For example, the control unit 20 can cause the user to log in to the smartphone 10 by face authentication based on at least one of the user's face in an image captured by the in-camera 15b and the user's face in a detection result of the infrared sensor 17e.

As illustrated in FIG. 5, the curbing action determination unit 20a determines whether or not a specific timing is reached until it is determined that the specific timing is reached (S101). Here, the specific timing in S101 is, for example, a timing of every 0.1 seconds.

When determining in S101 that the specific timing is reached, the curbing action determination unit 20a adds the outputs of the various operation devices of the operation unit 11 and the outputs of the various sensors of the sensor unit 17 to the acquisition history information 19b (S102). After the processing of S102, the curbing action determination unit 20a performs the processing of S101.

Note that the position of the smartphone 10 based on the outputs of the acceleration sensor 17a, the gyro sensor 17b, and the magnetic sensor 17c added to the acquisition history information 19b immediately after the start of the operation illustrated in FIG. 5 is the origin of the position of the smartphone 10 calculated on the basis of the outputs of the acceleration sensor 17a, the gyro sensor 17b, and the magnetic sensor 17c.

Next, an example of the operation of the smartphone 10 in a case of registering the relative position information 19c for posture determination will be described.

Figure 6:
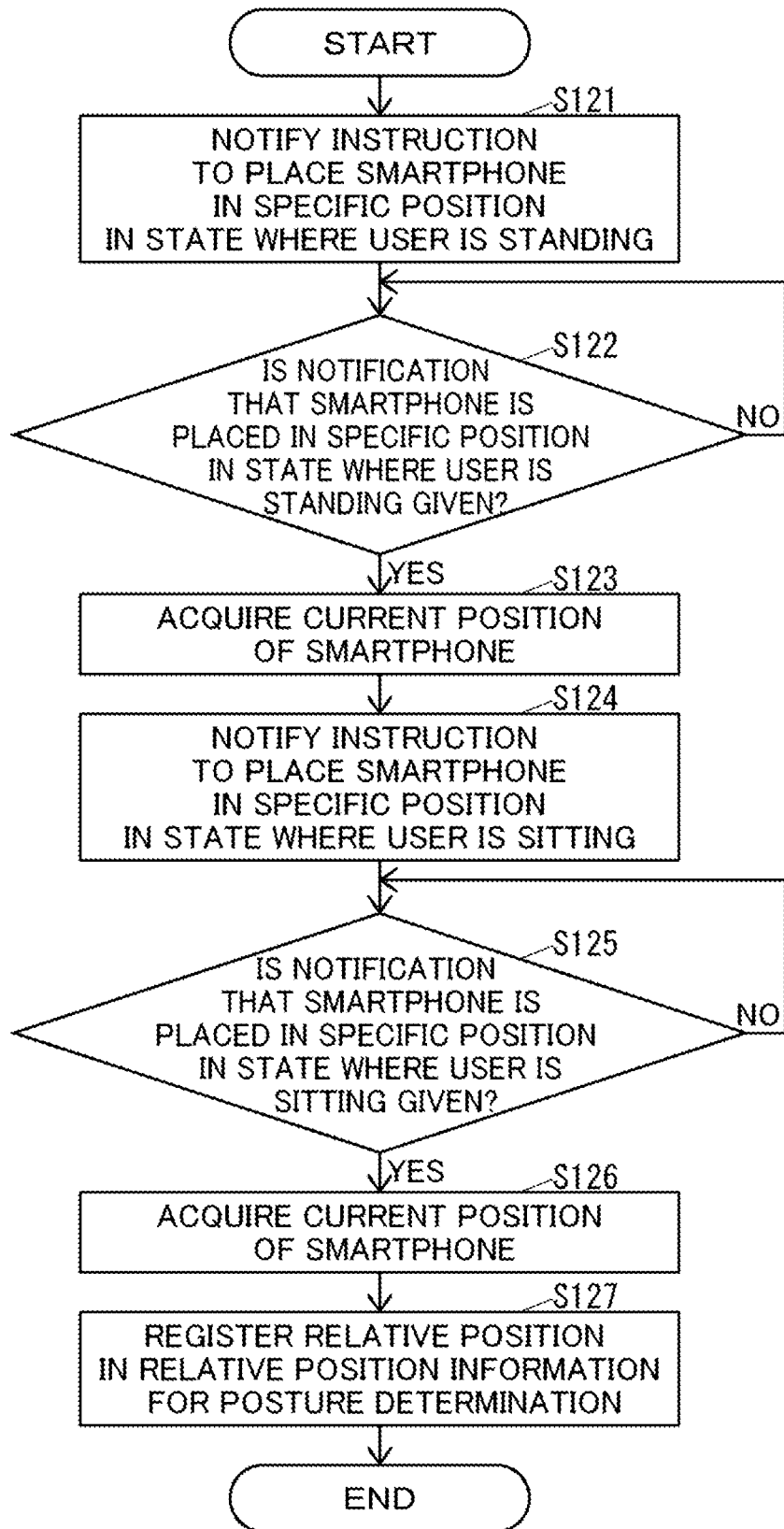
FIG. 6 is a flowchart of the operation of the smartphone illustrated in FIG. 2 in a case of registering relative position information for posture determination.

FIG. 6 is a flowchart of the operation of the smartphone 10 in a case of registering the relative position information 19c for posture determination.

The curbing action determination unit 20a may execute the operation illustrated in FIG. 6 when the user logs in to the smartphone 10 for the first time, or may execute the operation illustrated in FIG. 6 in response to an instruction from the user.

As illustrated in FIG. 6, the curbing action determination unit 20a notifies an instruction to place the smartphone 10 in a specific position in a state where the user is standing (S121). In S121, the curbing action determination unit 20a notifies the instruction by at least one of display by the display unit 12 and audio output by the speaker 13. Therefore, the user who checks the notification in S121 can stand and place the smartphone 10 in the specific position for the user. Here, the specific position is, for example, a position at which the smartphone 10 is arranged perpendicularly to the ground so that the image displayed by the display unit 12 faces the user's face in front of the user's face at a distance of 30 cm in a state where the user faces straight forward.

After the processing of S121, the curbing action determination unit 20a determines whether or not the notification that the smartphone 10 is placed in the specific position in a state where the user is standing is given via the operation unit 11, until the curbing action determination unit 20a determines that the notification that the smartphone 10 is placed in the specific position in a state where the user is standing is given via the operation unit 11 (S122).

When determining in S122 that the notification that the smartphone 10 is placed in the specific position in a state where the user is standing is given via the operation unit 11, the curbing action determination unit 20a acquires the current position of the smartphone 10 detected by the various sensors of the sensor unit 17 (S123). Note that the curbing action determination unit 20a may calculate the current position of the smartphone 10 on the basis of the outputs of the acceleration sensor 17a, the gyro sensor 17b, and the magnetic sensor 17c, for example.

After the processing of S123, the curbing action determination unit 20a notifies an instruction to place the smartphone 10 in a specific position in a state where the user is sitting (S124). In S124, the curbing action determination unit 20a notifies the instruction by at least one of display by the display unit 12 and audio output by the speaker 13. Therefore, the user who checks the notification in S124 can sit down and place the smartphone 10 in the specific position for the user. Here, the specific position is, for example, a position at which the smartphone 10 is arranged perpendicularly to the ground so that the image displayed by the display unit 12 faces the user's face in front of the user's face at a distance of 30 cm in a state where the user faces straight forward.

After the processing of S124, the curbing action determination unit 20a determines whether or not the notification that the smartphone 10 is placed in the specific position in a state where the user is sitting is given via the operation unit 11, until the curbing action determination unit 20a determines that the notification that the smartphone 10 is placed in the specific position in the state where the user is sitting is given via the operation unit 11 (S125).

When determining in S125 that the notification that the smartphone 10 is placed in the specific position in a state where the user is sitting is given via the operation unit 11, the curbing action determination unit 20a acquires the current position of the smartphone 10 detected by the various sensors of the sensor unit 17 (S126). Note that the curbing action determination unit 20a may calculate the current position of the smartphone 10 on the basis of the outputs of the acceleration sensor 17a, the gyro sensor 17b, and the magnetic sensor 17c, for example.

After the processing of S126, the curbing action determination unit 20a registers the relative position which is the position acquired in S126 relative to the position acquired in S123 in the relative position information 19c for posture determination (S127). After the processing of S127, the curbing action determination unit 20a ends the operation of FIG. 6.

Next, an example of the operation of the smartphone 10 in a case where the operation concentration mode is set will be described.

Figure 7:
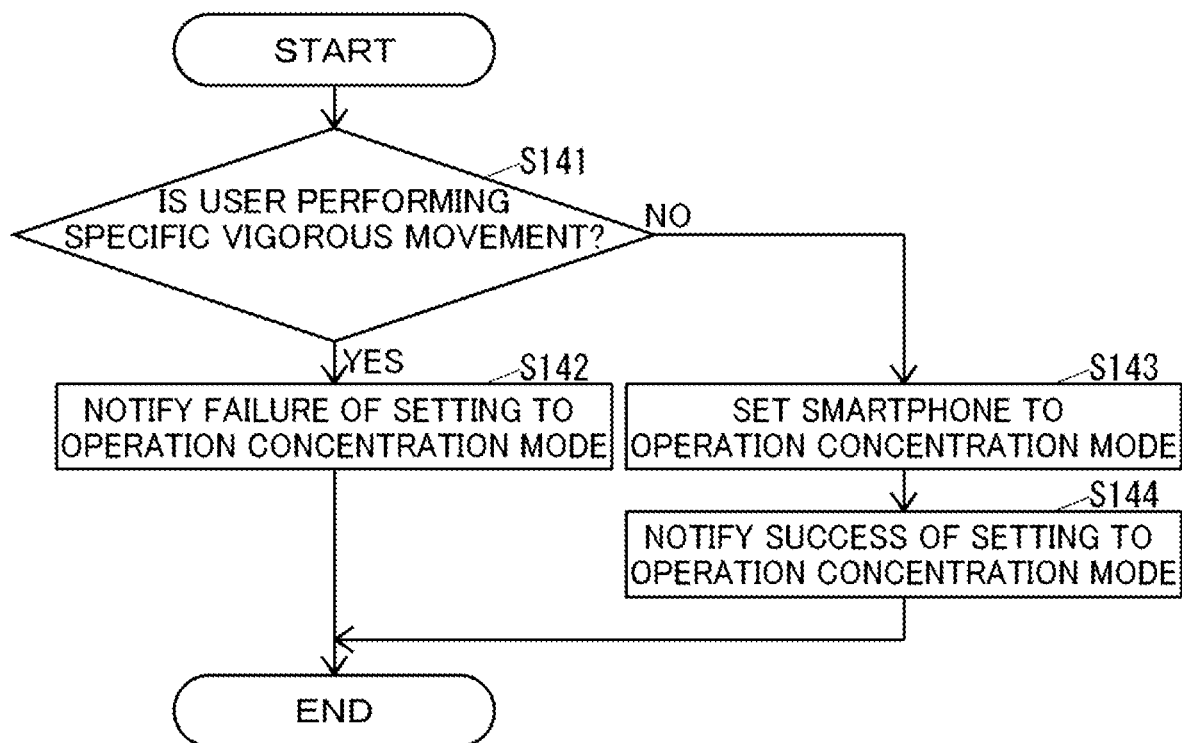
FIG. 7 is a flowchart of an example of the operation of the smartphone illustrated in FIG. 2 in a case where an operation concentration mode is set.

FIG. 7 is a flowchart of an example of the operation of the smartphone 10 in a case where the operation concentration mode is set.

When setting to the operation concentration mode is instructed via the operation unit 11, the curbing action determination unit 20a executes the operation illustrated in FIG. 7.

As illustrated in FIG. 7, the curbing action determination unit 20a determines whether or not the user is performing a specific vigorous movement (S141). Here, the specific vigorous movement may include "running", for example.

When determining in S141 that the user is performing the specific vigorous movement, the curbing action determination unit 20a notifies the failure of setting to the operation concentration mode by at least one of display by the display unit 12 and audio output by the speaker 13 (S142). After the processing of S142, the curbing action determination unit 20a ends the operation illustrated in FIG. 7.

When determining in S141 that the user is not performing the specific vigorous movement, the curbing action determination unit 20a sets the smartphone 10 to the operation concentration mode (S143).

Next, the curbing action determination unit 20a notifies the success of setting to the operation concentration mode by at least one of display by the display unit 12 and audio output by the speaker 13 (S144). After the processing of S144, the curbing action determination unit 20a ends the operation illustrated in FIG. 7.

Note that an application program that can be operated only when the smartphone 10 is set to the operation concentration mode may be installed in the smartphone 10.

Next, an example of the operation of the smartphone 10 when determining the curbing action to be executed will be described.

Figure 8:
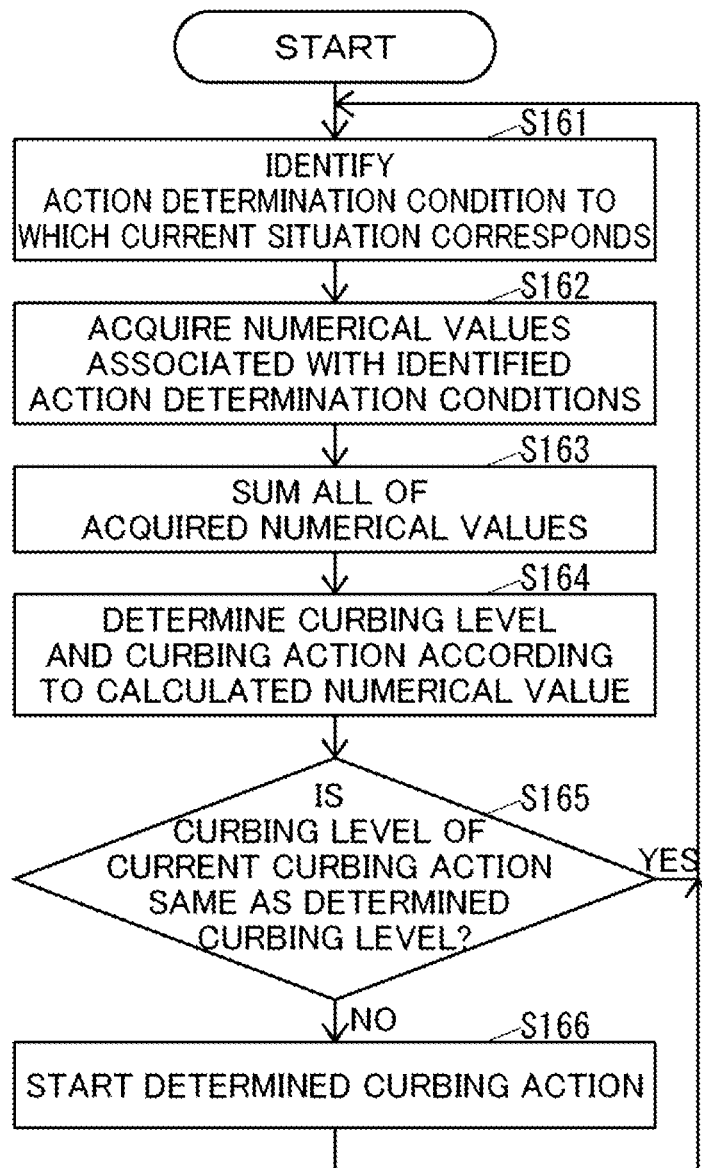
FIG. 8 is a flowchart of an example of the operation of the smartphone illustrated in FIG. 2 in a case of determining a curbing action to be executed.

FIG. 8 is a flowchart of an example of the operation of the smartphone 10 in a case of determining the curbing action to be executed.

The curbing action determination unit 20a executes the operation illustrated in FIG. 8 when the smartphone 10 is already activated.

As illustrated in FIG. 8, the curbing action determination unit 20a identifies an action determination condition to which the current situation corresponds among the action determination conditions indicated in the action determination condition table 19d (S161). Here, even when the current situation corresponds to a plurality of the action determination conditions of the same type of action determination condition, the curbing action determination unit 20a identifies all the action determination conditions of the same type of action determination condition to which the current situation corresponds. For example, when the current situation corresponds to a plurality of action determination conditions among the action determination condition "user location", the curbing action determination unit 20a identifies all the action determination conditions to which the current situation corresponds among the action determination condition "user location".

The curbing action determination unit 20a may identify "posture of user" on the basis of, for example, at least one of the output of the acceleration sensor 17a, the output of the gyro sensor 17b, and the output of the magnetic sensor 17c included in the acquisition history information 19b. For example, the curbing action determination unit 20a may determine that "posture of user" is "standing" when "movement of user" is "walking" or "running". The curbing action determination unit 20a may determine that "posture of user" is "standing" when, in a state where "posture of user" is "sitting", the position of the smartphone 10 rises and the relative position of the smartphone 10 before rising with respect to the position of the smartphone 10 after rising is included between a specific lower limit value and a specific upper limit value. The curbing action determination unit 20a may determine that "posture of user" is "sitting" when "movement of user" is maintained at "stopped" for a specific time or more after the situation where "movement of user" changes from "walking" or "running" to "stopped", and at the same time, the current relative position of the smartphone 10 with respect to the position of the smartphone 10 in a situation where "movement of user" is "walking" or "running" is included between a specific lower limit value and a specific upper limit value. On the other hand, even if "movement of user" is maintained at "stopped" for the specific time or more after "movement of user" changes from "walking" or "running" to "stopped", when the current relative position of the smartphone 10 with respect to the position of the smartphone 10 in the situation where "movement of user" is "walking" or "running" is not included between the specific lower limit value and the specific upper limit value, the user may be just crouching and not sitting, for example. Hence, the curbing action determination unit 20a does not necessarily determine that "posture of user" is "sitting". Here, when the relative position information 19c for posture determination is not stored in the storage unit 19, the curbing action determination unit 20a uses default values as the specific lower limit value and the specific upper limit value. On the other hand, when the relative position information 19c for posture determination is stored in the storage unit 19, the curbing action determination unit 20a can set a specific lower limit value and a specific upper limit value according to the user by setting a specific lower limit value and a specific upper limit value on the basis of the relative position indicated in the relative position information 19c for posture determination, and as a result, it is possible to improve the accuracy of determination as to whether the user is "standing" or "sitting".

The curbing action determination unit 20a may determine "movement of user" on the basis of, for example, at least one of the output of the acceleration sensor 17a, the output of the gyro sensor 17b, the output of the magnetic sensor 17c, and the output of the GPS unit 17d included in the acquisition history information 19b. For example, when a movement pattern of the smartphone 10 based on the output of the acceleration sensor 17a, the output of the gyro sensor 17b, and the output of the magnetic sensor 17c included in the acquisition history information 19b is similar to a pattern when the user is walking, the curbing action determination unit 20a may determine that "movement of user" is "walking". Additionally, the curbing action determination unit 20a may determine "movement of user" on the basis of, for example, the output of the GPS unit 17d included in the acquisition history information 19b and the map information 19f. For example, when the movement pattern of the smartphone 10 based on the output of the GPS unit 17d, which is included in the acquisition history information 19b, is similar to a pattern when the user moves by train, and the movement trajectory of the smartphone 10 based on the output of the GPS unit 17d follows a railway track in the map information 19f, the curbing action determination unit 20a may determine that "movement of user" is "moving by train". Note that the curbing action determination unit 20a may make the determination with reference to a normal movement pattern of the user when determining "movement of user" such as "moving in zigzag by foot", "suddenly stopping frequently while moving by foot", "moving laterally frequently while moving by foot", "jumping while moving by foot", "stopping frequently while moving by foot", or "going back and forth while moving by foot".

The curbing action determination unit 20*a* may determine "degree of concentration on operation" according to, for example, the direction of the user's face with respect to the image displayed by the display unit 12. For example, the curbing action determination unit 20*a* may determine that the direction of the user's face with respect to the image displayed by the display unit 12 comes closer to the front direction as "degree of concentration on operation" increases. Here, the curbing action determination unit 20*a* may identify the direction of the user's face with respect to the image displayed by the display unit 12 on the basis of, for example, at least one of the direction of the user's face in an image captured by the in-camera 15*b* and the direction of the user's face in the detection result by the infrared sensor 17*e*.

The curbing action determination unit 20*a* may determine "degree of concentration on operation" according to, for example, the distance between the image displayed by the display unit 12 and the user's face. For example, the curbing action determination unit 20*a* may determine that the distance between the image displayed by the display unit 12 and the user's face becomes closer to a specific distance such as 30 cm as "degree of concentration on operation" increases. Here, the curbing action determination unit 20*a* may identify the distance between the image displayed by the display unit 12 and the user's face on the basis of, for example, at least one of the size of the user's face in an image captured by the in-camera 15*b* and the size of the user's face in the detection result by the infrared sensor 17*e*.

The curbing action determination unit 20*a* may determine "degree of concentration on operation" according to, for example, the situation of the operation of a program of the smartphone 10 by the user. Here, the program of the smartphone 10 includes, for example, an operating system (OS), an application program, and the like. For example, when the number of characters input within a specific time is a specific number or more, the curbing action determination unit 20*a* may determine that "degree of concentration on operation" is "considerably concentrated". Note that the curbing action determination unit 20*a* may set the "specific number" as the reference of the "number of characters input within a specific time" for determining "degree of concentration on operation" with reference to the number of characters the user normally inputs within the specific time.

The curbing action determination unit 20*a* may determine "degree of operation concentration" on the basis of, for example, outputs of various operation devices of the operation unit 11 included in the acquisition history information 19*b*. For example, when the number of times the power button 11*a*, the volume button 11*b*, the home button 11*c*, or the position input device 11*d* is operated within a specific time is a specific number or more, the curbing action determination unit 20*a* may determine that "degree of concentration on operation" is "considerably concentrated". Note that the curbing action determination unit 20*a* may set the "specific number" as the reference of the "number of times the power button 11*a*, the volume button 11*b*, the home button 11*c*, or the position input device 11*d* is operated within a specific time" for determining "degree of concentration on operation" with reference to the number of times the user normally operates the power button 11*a*, the volume button 11*b*, the home button 11*c*, or the position input device 11*d* within the specific time.

The curbing action determination unit 20*a* may determine "erroneous operation" on the basis of, for example, outputs of various operation devices of the operation unit 11 included in the acquisition history information 19*b*. For example, when the number of erroneous operations based on the outputs of the various operation devices of the operation unit 11 included in the acquisition history information 19*b* is a specific number of times or more, such as three times per minute, the curbing action determination unit 20*a* may determine that "erroneous operation" is "frequent". Here, the specific number of times may be determined by the curbing action determination unit 20*a* on the basis of the number of times of erroneous operations acquired by the curbing action determination unit 20*a* in an environment where the user's body and mind are stable and the user is safe. Note that a safe environment for the user may be, for example, a region where the road is not bad and there are few obstacles such as people, vehicles, animals, and stationary objects. An erroneous operation may relate to, for example, character input or operation on a window.

The curbing action determination unit 20*a* may determine "user location" on the basis of, for example, the output of the GPS unit 17*d* included in the acquisition history information 19*b* and the map information 19*f*. For example, when the position of the smartphone 10 based on the output of the GPS unit 17*d*, which is included in the acquisition history information 19*b*, is "home" on the map information 19*f*, the curbing action determination unit 20*a* may determine that "user location" is "home". The curbing action determination unit 20*a* may determine whether or not the place where the user is currently present corresponds to "region with bad roads" on the basis of, for example, the output of the GPS unit 17*d* included in the acquisition history information 19*b*, the map information 19*f*, and the bad road region database 19*g*. The curbing action determination unit 20*a* may determine whether or not the place where the user is currently present corresponds to "region with many people" on the basis of, for example, the output of the GPS unit 17*d* included in the acquisition history information 19*b*, the map information 19*f*, the crowded region database 19*h*, and congestion information acquired from the outside of the smartphone 10 in real time. The curbing action determination unit 20*a* may determine whether or not the place where the user is currently present corresponds to "region with many vehicles" on the basis of, for example, the output of the GPS unit 17*d* included in the acquisition history information 19*b*, the map information 19*f*, the multi-vehicle region database 19*i*, and congestion information acquired in real time from the outside of the smartphone 10. The curbing action determination unit 20*a* may determine whether or not the place where the user is currently present corresponds to "region with many animals" on the basis of, for example, the output of the GPS unit 17*d* included in the acquisition history information 19*b*, the map information 19*f*, and the multi-animal region database 19*j*. The curbing action determination unit 20*a* may determine whether or not the place where the user is currently present corresponds to "region with many stationary objects" on the basis of, for example, the output of the GPS unit 17*d* included in acquisition history information 19*b*, the map information 19*f*, and the multi-stationary-object region database 19*k*.

The curbing action determination unit 20*a* may determine "weather" on the basis of, for example, the output of the GPS unit 17*d* included in the acquisition history information 19*b*, the map information 19*f*, and weather information acquired in real time from the outside of the smartphone 10.

The curbing action determination unit 20*a* may determine that there is a purpose of movement of the user on the basis of information input to a specific application program by the user. For example, the curbing action determination unit 20*a* may determine that there is a purpose of movement of the user when route guidance by a navigation program such as a car navigation program is started or when a purpose of movement of the user, such as taking a walk in a region designated by the user for a time designated by the user, is input to an application program to which the purpose of the movement of the user is input. Additionally, in a case where the smartphone 10 has a function of determining whether or not the user is currently commuting on the basis of the tendency of the user's normal movement, the curbing action determination unit 20*a* may determine that there is a purpose of movement of the user when it is determined that the user is currently commuting.

After the processing of S161, the curbing action determination unit 20*a* acquires numerical values associated with the action determination conditions identified in S161 in the action determination condition table 19*d* (S162).

Next, the curbing action determination unit 20*a* sums all the numerical values acquired in S162 (S163).

Next, the curbing action determination unit 20*a* determines the curbing level and the curbing action according to the numerical value calculated in S163 on the basis of the curbing action table 19*e* (S164).

Next, the curbing action determination unit 20*a* determines whether or not the curbing level of the current curbing action is the same as the curbing level determined in S164 (S165).

When determining in S165 that the curbing level of the current curbing action is not the same as the curbing level determined in S164, the curbing action determination unit 20*a* starts the curbing action determined in S164 (S166).

When determining in S165 that the curbing level of the current curbing action is the same as the curbing level determined in S164 or the processing of S166 ends, the curbing action determination unit 20*a* performs the processing of S161.

Next, an example of the operation of the smartphone 10 when executing the curbing action will be described.

Figure 9:
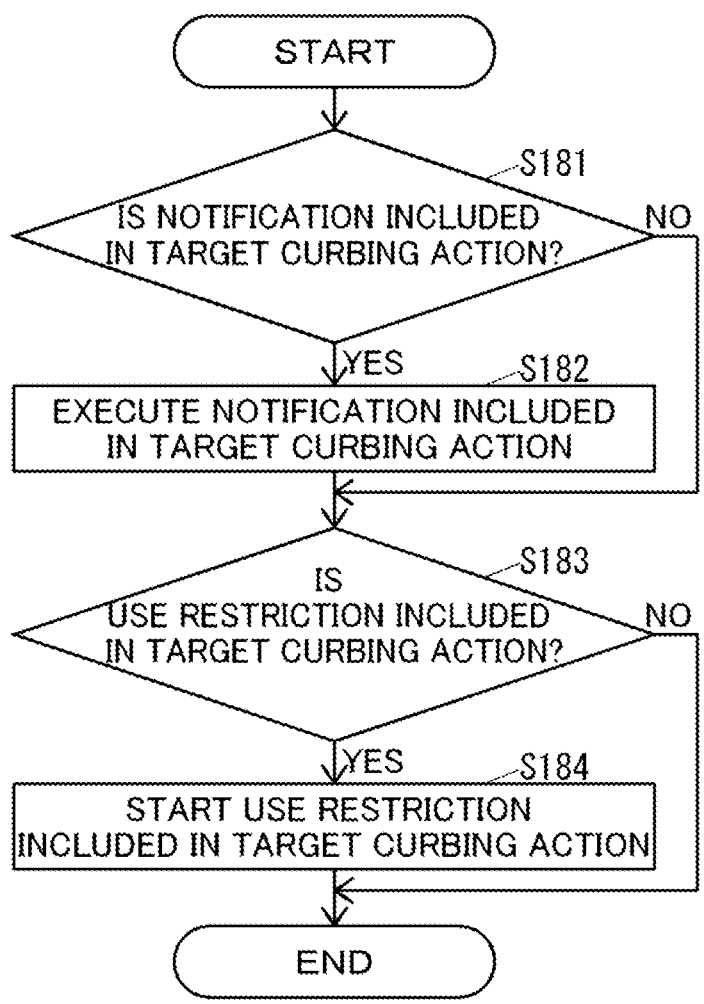
FIG. 9 is a flowchart of an example of the operation of the smartphone illustrated in FIG. 2 in a case of executing the curbing action.

FIG. 9 is a flowchart of an example of the operation of the smartphone 10 in a case of executing the curbing action.

When starting the curbing action in S166, the curbing action execution unit 20*b* executes the operation illustrated in FIG. 9.

As illustrated in FIG. 9, the curbing action execution unit 20*b* determines whether or not a notification is included in the curbing action (hereinafter referred to as "target curbing action" in operation illustrated in FIG. 9) determined in S164 (S181).

When determining in S181 that a notification is included in the target curbing action, the curbing action execution unit 20*b* executes the notification included in the target curbing action (S182).

When determining in S181 that no notification is included in the target curbing action or the processing of S182 ends, the curbing action execution unit 20*b* determines whether or not use restriction is included in the target curbing action (S183).

When determining in S183 that use restriction is included in the target curbing action, the curbing action execution unit 20*b* starts the use restriction included in the target curbing action (S184).

When determining in S183 that no use restriction is included in the target curbing action or the processing of S184 ends, the curbing action execution unit 20*b* ends the operation illustrated in FIG. 9.

Next, an example of the operation of the smartphone 10 regarding exceptional use in an emergency will be described.

Figure 10:
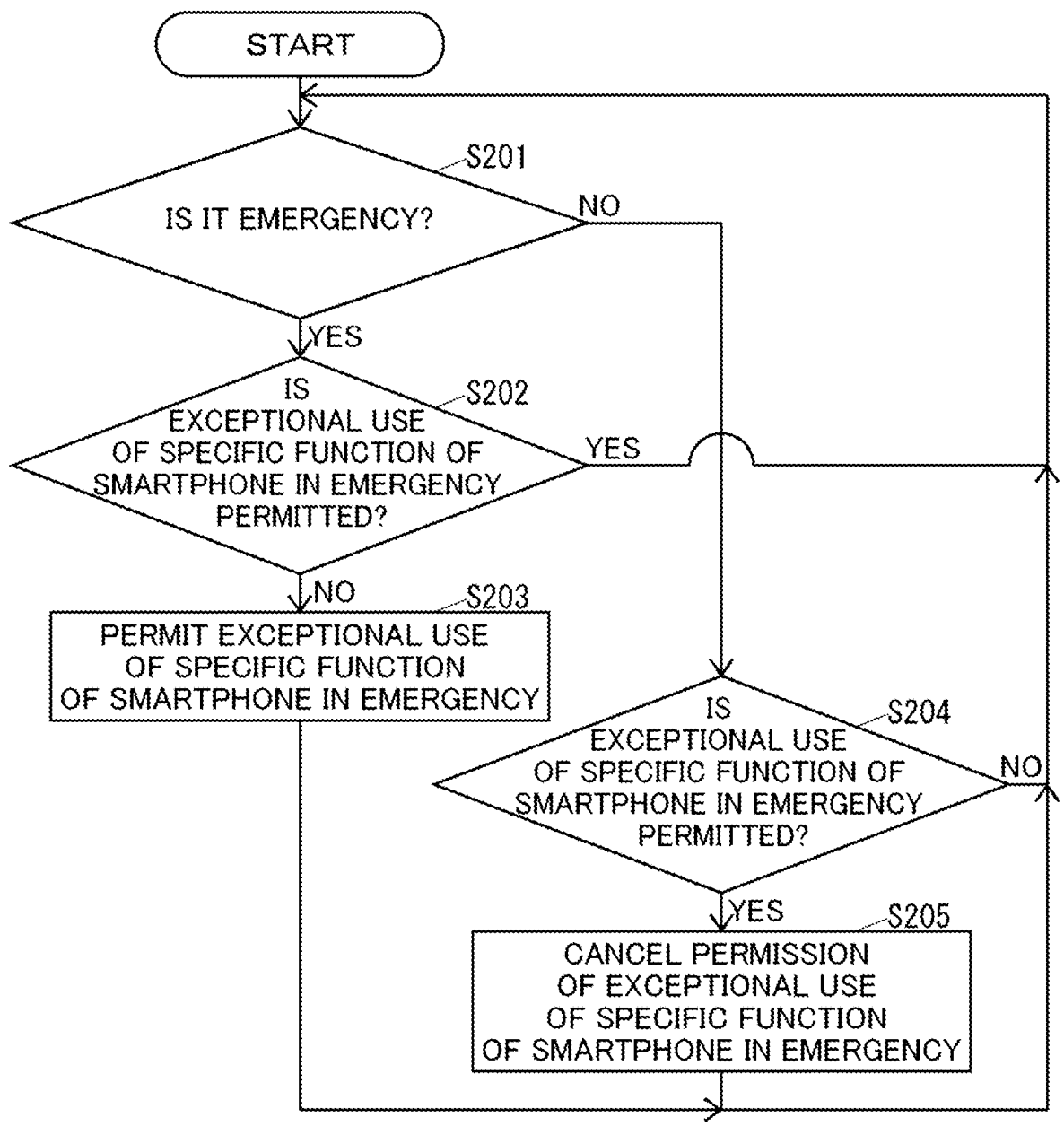
FIG. 10 is a flowchart of an example of the operation of the smartphone illustrated in FIG. 2 regarding exceptional use in an emergency.

FIG. 10 is a flowchart of an example of the operation of the smartphone 10 regarding exceptional use in an emergency.

The curbing action execution unit 20*b* executes the operation illustrated in FIG. 10 when executing the use restriction.

As illustrated in FIG. 10, the curbing action execution unit 20*b* determines whether or not it is an emergency (S201). For example, the curbing action execution unit 20*b* may determine that it is an emergency when the current position of the smartphone 10 is in a target region of emergency information distributed from the outside of the smartphone 10. Here, emergency information includes, for example, disaster information and accident information. Additionally, the curbing action execution unit 20*b* may determine that it is an emergency when the fact that it is an emergency is input via the operation unit 11.

When determining that it is an emergency in S201, the curbing action execution unit 20*b* determines whether or not exceptional use of a specific function of the smartphone 10 in an emergency is permitted (S202).

When determining in S202 that exceptional use of the specific function of the smartphone 10 in an emergency is not permitted, the curbing action execution unit 20*b* permits exceptional use of the specific function of the smartphone 10 in an emergency (S203). For example, the curbing action execution unit 20*b* may permit use of the specific function such as a telephone call, a chat, and browsing of information on the Internet. Therefore, the user can perform emergency use of the smartphone 10 such as making an emergency call with the smartphone 10.

The curbing action execution unit 20*b* performs the processing of S201 when determining in S202 that exceptional use of the specific function of the smartphone 10 in an emergency is permitted or the processing of S203 ends.

When determining in S201 that it is not an emergency, the curbing action execution unit 20*b* determines whether or not exceptional use of the specific function of the smartphone 10 in an emergency is permitted (S204).

When determining in S204 that exceptional use of the specific function of the smartphone 10 in an emergency is permitted, the curbing action execution unit 20*b* cancels the permission of exceptional use of the specific function of the smartphone 10 in an emergency (S205).

When determining in S204 that exceptional use of the specific function of the smartphone 10 in an emergency is not permitted or the processing of S205 ends, the curbing action execution unit 20*b* performs the processing of S201.

Next, an example of the operation of the smartphone 10 regarding exceptional use when the smartphone 10 is fixed to a vehicle will be described.

Figure 11:
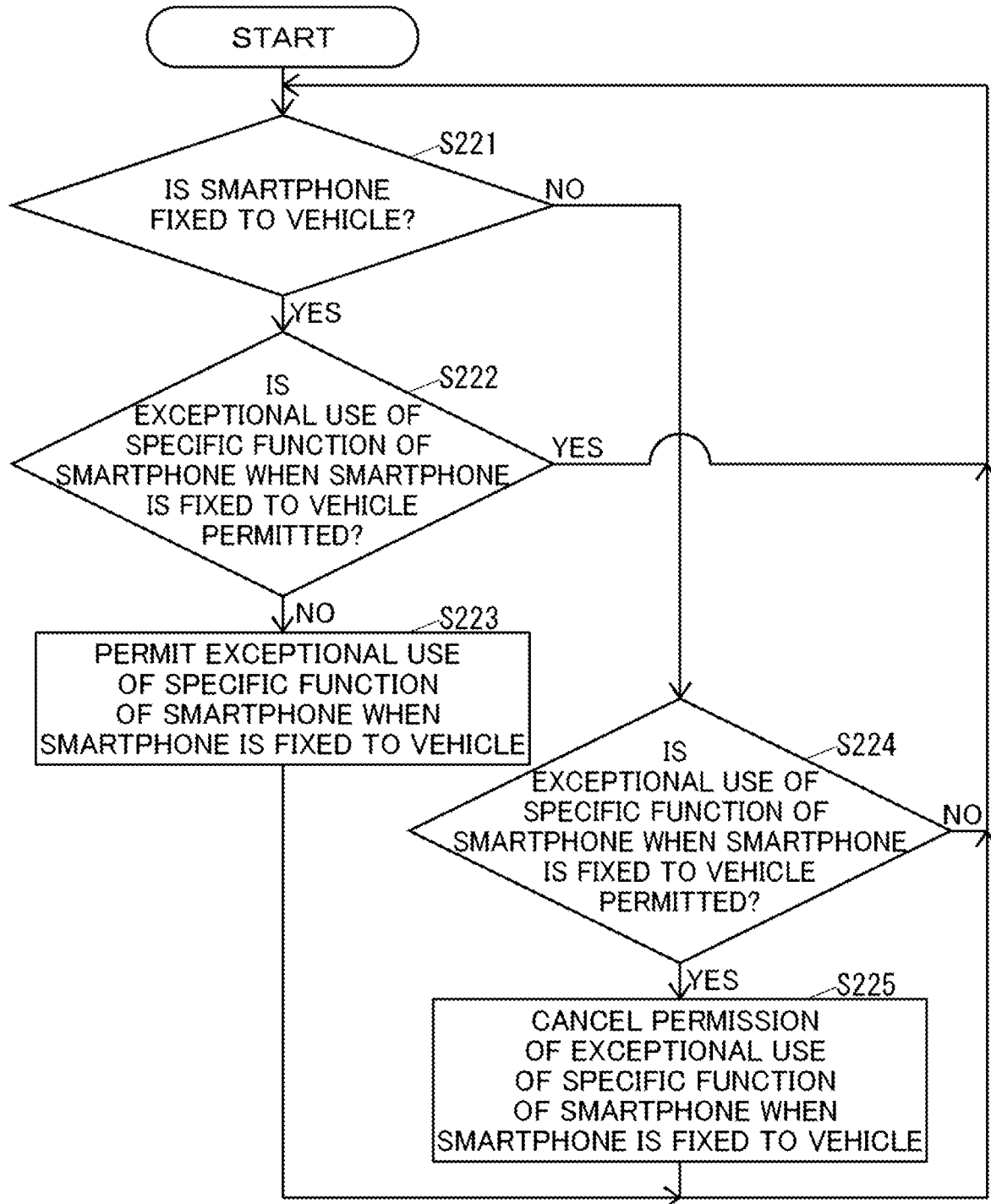
FIG. 11 is a flowchart of an example of the operation of the smartphone illustrated in FIG. 2 regarding exceptional use when the smartphone is fixed to a vehicle.

FIG. 11 is a flowchart of an example of the operation of the smartphone 10 regarding exceptional use when the smartphone 10 is fixed to a vehicle.

The curbing action execution unit 20*b* executes the operation illustrated in FIG. 11 when executing the use restriction.

As illustrated in FIG. 11, the curbing action execution unit 20*b* determines whether or not the smartphone 10 is fixed to a vehicle (S221). Note that the vehicle in S221 is not a vehicle that causes danger such as collision for the user, but is a vehicle to which the smartphone 10 is fixed, and includes, for example, an automobile, a bicycle, a wheelchair, a stroller, and a ship. For example, the curbing action execution unit 20*b* may determine that the smartphone 10 is fixed to a vehicle when a device (hereinafter referred to as "fixing device") for fixing the smartphone 10 is installed in the vehicle and information indicating that the smartphone 10 is fixed to the fixing device is received from the fixing device. Additionally, the curbing action execution unit 20b may determine that the smartphone 10 is fixed to a vehicle when the fact that the smartphone 10 is fixed to a vehicle is input via the operation unit 11.

When determining in S221 that the smartphone 10 is fixed to a vehicle, the curbing action execution unit 20b determines whether or not exceptional use of a specific function of the smartphone 10 when the smartphone 10 is fixed to a vehicle is permitted (S222).

When determining in S222 that exceptional use of the specific function of the smartphone 10 when the smartphone 10 is fixed to a vehicle is not permitted, the curbing action execution unit 20b permits exceptional use of the specific function of the smartphone 10 when the smartphone 10 is fixed to a vehicle (S223). For example, the curbing action execution unit 20b may permit use of the specific function, such as a car navigation function and a hands-free call function, which allows viewing of an image displayed on the display unit 12 or use without operating the operation unit 11.

When determining in S222 that exceptional use of the specific function of the smartphone 10 when the smartphone 10 is fixed to a vehicle is permitted or the processing of S223 ends, the curbing action execution unit 20b performs the processing of S221.

When determining in S221 that the smartphone 10 is not fixed to a vehicle, the curbing action execution unit 20b determines whether or not exceptional use of the specific function of the smartphone 10 when the smartphone 10 is fixed to a vehicle is permitted (S224).

When determining in S224 that exceptional use of the specific function of the smartphone 10 when the smartphone 10 is fixed to a vehicle is permitted, the curbing action execution unit 20b cancels the permission of exceptional use of the specific function of the smartphone 10 when the smartphone 10 is fixed to a vehicle (S225).

When determining in S224 that exceptional use of the specific function of the smartphone 10 when the smartphone 10 is fixed to a vehicle is not permitted or the processing of S225 ends, the curbing action execution unit 20b performs the processing of S221.

Next, an example of the operation of the smartphone 10 regarding exceptional use when an image displayed on the display unit 12 is not viewed will be described.

Figure 12:
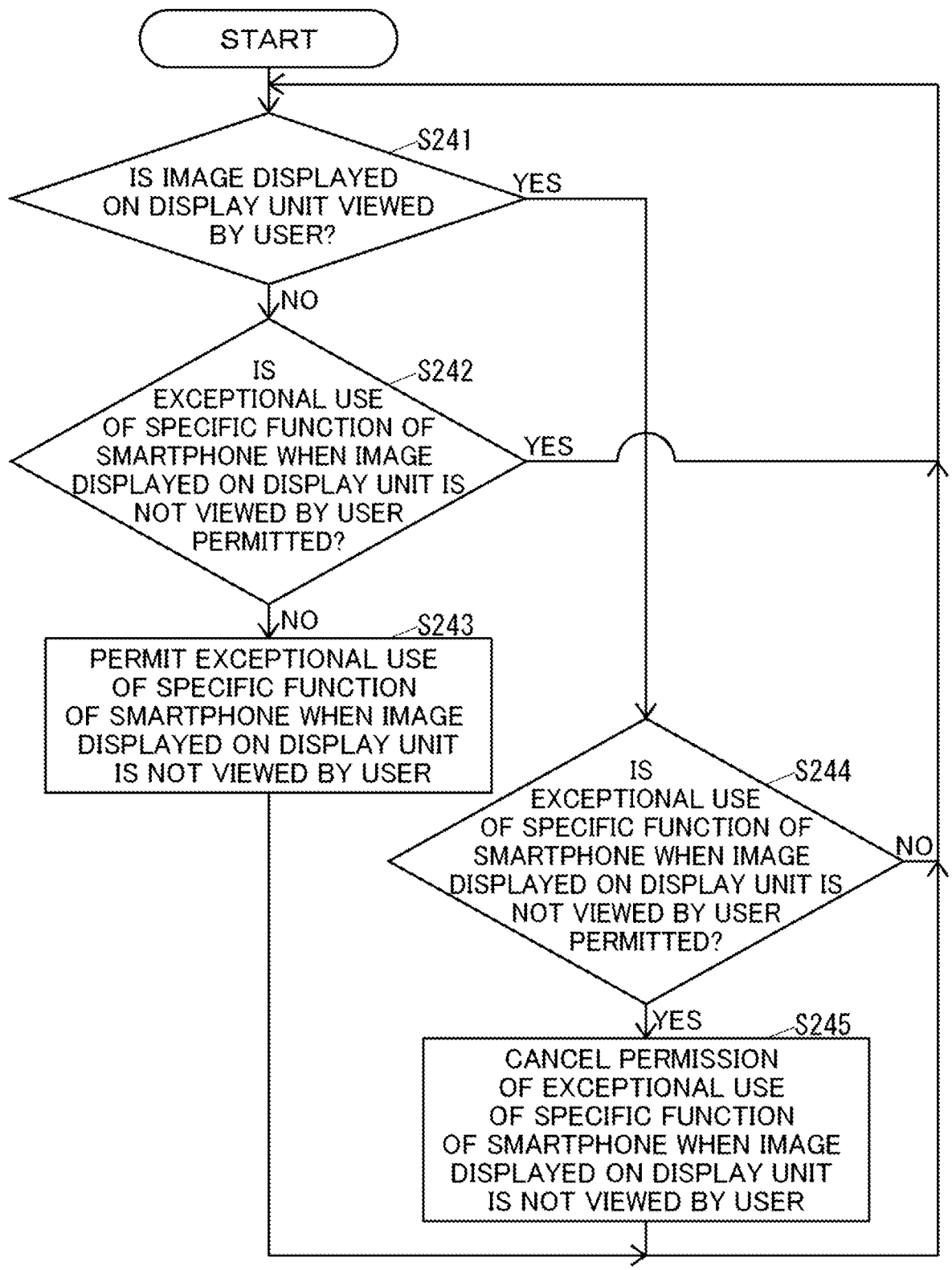
FIG. 12 is a flowchart of an example of the operation of the smartphone illustrated in FIG. 2 regarding exceptional use when an image displayed on a display unit is not viewed.

FIG. 12 is a flowchart of an example of the operation of the smartphone 10 regarding exceptional use when an image displayed on the display unit 12 is not viewed.

The curbing action execution unit 20b executes the operation illustrated in FIG. 12 when executing the use restriction.

As illustrated in FIG. 12, the curbing action execution unit 20b determines whether or not an image displayed on the display unit 12 is viewed by the user (S241). The curbing action execution unit 20b may determine whether or not an image displayed on the display unit 12 is viewed by the user according to, for example, the direction of the user's face with respect to the image displayed by the display unit 12. Here, the curbing action execution unit 20b may calculate the direction of the user's face with respect to the image displayed by the display unit 12 on the basis of, for example, at least one of the direction of the user's face in an image captured by the in-camera 15b and the direction of the user's face in the detection result by the infrared sensor 17e.

When determining in S241 that an image displayed on the display unit 12 is not viewed by the user, the curbing action execution unit 20b determines whether or not exceptional use of a specific function of the smartphone 10 when an image displayed on the display unit 12 is not viewed by the user is permitted (S242).

When determining in S242 that exceptional use of the specific function of the smartphone 10 when an image displayed on the display unit 12 is not viewed by the user is not permitted, the curbing action execution unit 20b permits exceptional use of the specific function of the smartphone 10 when an image displayed on the display unit 12 is not viewed by the user (S243). For example, the curbing action execution unit 20b may permit use of the specific function, such as a call function, a sound reproduction application, and a recording application, which can be used without viewing an image displayed on the display unit 12.

When determining in S242 that exceptional use of the specific function of the smartphone 10 when an image displayed on the display unit 12 is not viewed by the user is permitted or the processing of S243 ends, the curbing action execution unit 20b performs the processing of S241.

When determining in S241 that an image displayed on the display unit 12 is viewed by the user, the curbing action execution unit 20b determines whether or not exceptional use of the specific function of the smartphone 10 when an image displayed on the display unit 12 is not viewed by the user is permitted (S244).

When determining in S244 that exceptional use of the specific function of the smartphone 10 when an image displayed on the display unit 12 is not viewed by the user is permitted, the curbing action execution unit 20b cancels the permission of exceptional use of the specific function of the smartphone 10 when an image displayed on the display unit 12 is not viewed by the user (S245).

When the curbing action execution unit 20b determines in S244 that exceptional use of the specific function of the smartphone 10 when an image displayed on the display unit 12 is not viewed by the user is not permitted, or the processing of S245 ends, the curbing action execution unit 20b performs the processing of S241.

The foregoing describes exceptional use of a specific function of the smartphone 10 in an emergency, exceptional use of a specific function of the smartphone 10 when the smartphone 10 is fixed to a vehicle, and exceptional use of a specific function of the smartphone 10 when an image displayed on the display unit 12 is not viewed by the user. However, the curbing action execution unit 20b can set exceptional use of a specific function of the smartphone 10 with contents according to an instruction from the user. For example, the user may instruct the smartphone 10 such that the function of audio output of the smartphone 10 becomes exceptionally usable while the user is moving by train.

In the above description, when both the notification and the use restriction are included in the curbing action determined in S164, the curbing action execution unit 20b executes the notification and the starts the use restriction almost simultaneously (S181 to S184). However, the curbing action execution unit 20b may start the use restriction included in the curbing action determined in S164 only when the user continues to use the specific function of the smartphone 10 with no change in the curbing level determined in S164 after executing the notification included in the curbing action determined in S164.

As described above, when the current situation corresponds to at least one of the action determination conditions, the smartphone 10 determines the curbing action according to the action determination condition to which the current situation corresponds (S161 to S164). Therefore, it is possible to curb inappropriate use of the smartphone 10 by the user.

The smartphone 10 curbs the user's inappropriate use of the smartphone 10 by notifying the user (S182), so that the user can be prompted not to use the smartphone 10 inappropriately.

Since the smartphone 10 curbs the user's inappropriate use of the smartphone 10 by use restriction of the smartphone 10 (S184), the user's inappropriate use of the smartphone 10 can be curbed effectively.

As illustrated in FIG. 3, the smartphone 10 includes an action determination condition related to the state of the posture of the user, an action determination condition related to movement of the user, an action determination condition related to the degree of concentration on the operation of the smartphone 10 by the user, an action determination condition related to the state of erroneous operation of the smartphone 10 by the user, an action determination condition related to the location of the user, an action determination condition related to the weather of the place where the user is present, an action determination condition related to whether or not there is a purpose of movement of the user, and an action determination condition related to whether or not the smartphone 10 is set to the operation concentration mode. Hence, an appropriate curbing action can be executed. Therefore, the smartphone 10 can appropriately curb inappropriate use of the smartphone 10 by the user.

In a case where the user is sitting while using the smartphone 10, there is low risk for the user, such as no possibility of falling, as compared with a case where the user is standing while using the smartphone 10. Therefore, each value in the action determination condition table 19d and the curbing action table 19e may be set such that the curbing level is always level 0 when the user is sitting.

In a case where the user walks or runs while using the smartphone 10, there is high risk for the user, such as a high possibility of colliding with something, as compared with a case where the user sits down or stops while using the smartphone 10. Therefore, each value in the action determination condition table 19d and the curbing action table 19e may be set such that the curbing level is lower when the user is sitting or stopped than when the user walks or runs. For example, each value in the action determination condition table 19d and the curbing action table 19e may be set such that the curbing level is level 0 only when the user is sitting or stopped. For example, in a case where the smartphone 10 has a function of determining whether or not the user is currently commuting, each value in the action determination condition table 19d and the curbing action table 19e may be set such that the curbing level is level 0 only while the user is sitting or stopped while the user is currently commuting.

In a case where the user performs a specific movement such as moving in zigzag by foot, suddenly stopping frequently while moving by foot, moving laterally frequently while moving by foot, or jumping while moving by foot, there is a high possibility that the user is moving by foot while avoiding obstacles. Therefore, there is a high possibility that the user collides with an obstacle, and there is high risk. Therefore, each value in the action determination condition table 19d and the curbing action table 19e may be set such that the curbing level is higher when the user performs a specific movement, such as moving in zigzag by foot, suddenly stopping frequently while moving by foot, moving laterally frequently while moving by foot, or jumping while moving by foot, than when the user does not perform such the specific movement.

In a case where the user performs a specific movement such as stopping frequently while moving by foot or going back and forth while moving by foot, there is a high possibility that the user is in a region that the user is not familiar with. Therefore, there is a high possibility that the user collides with an obstacle, for example, and there is high risk. Therefore, each value in the action determination condition table 19d and the curbing action table 19e may be set such that the curbing level is higher when the user executes a specific movement, such as stopping frequently while moving by foot or going back and forth while moving by foot, than when the user does not perform such the specific movement.

In a case where the degree of concentration on the operation of the smartphone 10 by the user is high, there is high risk for the user when moving while using the smartphone 10, such as a high possibility of colliding with something, as compared with a case where the degree of concentration on the operation of the smartphone 10 by the user is low. Therefore, each value in the action determination condition table 19d and the curbing action table 19e may be set such that the curbing level is higher when the degree of concentration on the operation of the smartphone 10 by the user is high than when the degree of concentration on the operation of the smartphone 10 by the user is low.

In a case where erroneous operation of the smartphone 10 by the user is frequent, as compared with a case where erroneous operation of the smartphone 10 by the user is not frequent, there is a high possibility that at least one of the user's mental and physical health is bad, or at least one of rain and wind is strong in the place where the user is present. Hence, there is high risk for the user when moving while using the smartphone 10, such as a high possibility of colliding with something. Therefore, each value in the action determination condition table 19d and the curbing action table 19e may be set such that the curbing level is higher when erroneous operation of the smartphone 10 by the user is frequent than when erroneous operations of the smartphone 10 by the user is not frequent.

In a case where the user is present in a place or a region that the user is familiar with, such as a home, a workplace, a neighborhood of the home, and a neighborhood of the workplace, there is low risk for the user, such as a low possibility of colliding with something, as compared with a case where the user is present in a place or a region that the user is not familiar with. Therefore, each value in the action determination condition table 19d and the curbing action table 19e may be set such that the curbing level is lower when the user is present in a place or a region that the user is familiar with than when the user is present in a place or a region that the user is not familiar with.

In a case where the user is present in a place or region with many people such as a commercial site, an event venue, and a terminal station, there is high risk for the user, such as a high possibility of colliding with people, as compared with a case where the user is present in a place or region with few people such as a park and a suburb. Therefore, each value in the action determination condition table 19d and the curbing action table 19e may be set such that the curbing level is higher when the user is present in a place or region with many people than when the user is present in a place or region with few people.

Similarly, the values in the action determination condition table 19d and the curbing action table 19e may be set such that the curbing level is higher when the user is present in a region with many vehicles than when the user is present in a region with few vehicles. Additionally, the values in the action determination condition table 19d and the curbing action table 19e may be set such that the curbing level is higher when the user is present in a region with many animals than when the user is present in a region with few animals.

In a case where the user is present in a region with many stationary objects, there is high risk for the user when moving while using the smartphone 10, such as a high possibility of colliding with a stationary object, as compared with a case where the user is present in a region with few stationary objects. Therefore, each value in the action determination condition table 19d and the curbing action table 19e may be set such that the curbing level is higher when the user is present in a region with many stationary objects than when the user is present in a region with few stationary objects.

In a case where the user is present in a region with bad roads, there is high risk for the user when moving while using the smartphone 10, such as a high possibility of falling, as compared with a case where the user is present in a region with good roads. Therefore, each value in the action determination condition table 19d and the curbing action table 19e may be set such that the curbing level is higher when the user is present in a region with bad roads than when the user is present in a region with good roads.

In a case where the user goes out while using the smartphone 10 when it is raining or a strong wind is blowing, there is high risk for the user, such as a high possibility of falling, as compared with a case where the user goes out while using the smartphone 10 when the weather is good. Therefore, each value in the action determination condition table 19d and the curbing action table 19e may be set such that the curbing level is higher when the user goes out in bad weather such as raining or windy than when the user goes out in good weather.

In a case where there is a purpose of movement of the user, the user should concentrate on the movement in order to achieve the purpose. Therefore, it is not appropriate for the user to move while using the smartphone 10 as compared with a case where there is no purpose of movement of the user. Therefore, each value in the action determination condition table 19d and the curbing action table 19e may be set such that the curbing level is higher when there is a purpose of movement of the user than when there is no purpose of the movement of the user.

In a case where the smartphone 10 is set to the operation concentration mode, the user concentrates on the operation of the smartphone 10. Hence, there is a low possibility that the user moves while using the smartphone 10, and there is low risk for the user, such as a low possibility of the user colliding with something, as compared with a case where the smartphone 10 is not set to the operation concentration mode. Therefore, each value in the action determination condition table 19d and the curbing action table 19e may be set such that the curbing level is lower when the smartphone 10 is set to the operation concentration mode than when the smartphone 10 is not set to the operation concentration mode. Note that each value in the action determination condition table 19d and the curbing action table 19e may be set such that, even when the smartphone 10 is set to the operation concentration mode, when the user starts running, for example, the curbing level increases.

When executing the curbing action, the smartphone 10 permits exceptional use of a specific function of the smartphone 10 in a specific situation (S203, S223, and S243). Hence, it is possible to reduce adverse effects caused by curbing the user's inappropriate use of the smartphone 10.

In the present embodiment, the curbing action determination unit 20a identifies the action determination conditions to which the current situation corresponds (S161), sums the numerical values associated with the action determination conditions identified in S161 in the action determination condition table 19d (S163), and determines the curbing action according to the numerical value calculated in S163 on the basis of the curbing action table 19e (S164). However, when the current situation corresponds to at least one of the action determination conditions, as long as the curbing action according to the action determination condition to which the current situation corresponds can be determined, the curbing action determination unit 20a may determine the curbing action by other methods. For example, the curbing action determination unit 20a may determine the curbing action according to the action determination condition to which the current situation corresponds using a neural network.

FIG. 13 is a block diagram illustrating an example different from the example illustrated in FIG. 2 of the inappropriate use control system according to the present embodiment.

The above describes an example in which the inappropriate use control system of the present invention includes only the electronic device of the present invention. However, the inappropriate use control system of the present invention may be configured by the electronic device of the present invention and at least one electronic device outside the electronic device of the present invention. For example, an inappropriate use control system 70 illustrated in FIG. 13 includes a smartphone 71 as the electronic device of the present invention and a cloud service 72 with which the smartphone 71 can communicate via a network 70a. The cloud service 72 implements some of the functions implemented by the smartphone 10 (see FIG. 2) instead of the smartphone 71.

In the above, an example of a smartphone has been described as the electronic device of the present invention. However, the electronic device of the present invention may be a device other than a smartphone as long as it is carried by the user and used by the user. For example, the electronic device of the present invention may be a mobile phone other than a smartphone, a tablet, or a wearable terminal. Here, as the wearable terminal, for example, a smart watch, a ring-type activity meter, or the like can be considered.

What is claimed is:

1. An inappropriate use control system comprising:
a memory storing instructions; and
a processor connected to the memory and configured to execute the instructions to:
identify at least one of action determination conditions corresponding to a current situation, the action determination conditions including a condition related to a state of erroneous operation of the electronic device by the user;
determine a curbing action corresponding to the action determination conditions corresponding to the current situation, the curbing action being an action for curbing a user's inappropriate use of an electronic device carried by the user and used by the user;
determine a reference number of times of determination of the state of erroneous operation of the electronic device by the user on the basis of a number of times of erroneous operation of the electronic device by the user acquired in advance;

determine that erroneous operation of the electronic device by the user is frequent as the state of erroneous operation of the electronic device by the user when the number of times of erroneous operations of the electronic device by the user is equal to or greater than the reference number of times; and execute the determined curbing action, wherein when the current situation corresponds to at least one of the action determination conditions as conditions for determining the curbing action, the curbing action is determined according to a pattern of the action determination conditions to which the current situation corresponds, and the curbing actions control the electronic device to prohibit at least one of an image operation, display of an image, audio output, and audio input.

2. The inappropriate use control system of claim 1, wherein the erroneous operation relates to character input.

3. The inappropriate use control system of claim 1, wherein the erroneous operation relates to an operation on a window.

4. A non-transitory computer-readable storage medium storing an inappropriate use control program, which executes on a processor to cause the processor to perform a process comprising:

identifying at least one of action determination conditions corresponding to a current situation, the action determination conditions including a condition related to a state of erroneous operation of the electronic device by the user;

determining a curbing action corresponding to the action determination conditions corresponding to the current situation, the curbing action being an action for curbing a user's inappropriate use of an electronic device carried by the user and used by the user;

determining a reference number of times of determination of the state of erroneous operation of the electronic device by the user on the basis of a number of times of erroneous operation of the electronic device by the user acquired in advance;

determining that erroneous operation of the electronic device by the user is frequent as the state of erroneous operation of the electronic device by the user when the number of times of erroneous operations of the electronic device by the user is equal to or greater than the reference number of times; and executing the determined curbing action, wherein when the current situation corresponds to at least one of the action determination conditions as conditions for determining the curbing action, the curbing action is determined according to a pattern of the action determination conditions to which the current situation corresponds, and the curbing actions control the electronic device to prohibit at least one of an image operation, display of an image, audio output, and audio input.

5. The non-transitory computer-readable storage medium of claim 4, wherein the erroneous operation relates to character input.

6. The non-transitory computer-readable storage medium of claim 4, wherein the erroneous operation relates to an operation on a window.

7. An inappropriate use control system comprising:

a memory storing instructions; and a processor connected to the memory and configured to execute the instructions to:

identify at least one of action determination conditions corresponding to a current situation;

determine a curbing action corresponding to the action determination conditions corresponding to the current situation, the curbing action being an action for curbing a user's inappropriate use of an electronic device carried by the user and used by the user;

execute the determined curbing action; and permit exceptional use of a specific function of the electronic device in a specific situation when executing the curbing action, the specific situation including at least one of a situation in which an image displayed on the electronic device is not viewed by the user and a situation in which the user is moving by train, wherein when the current situation corresponds to at least one of the action determination conditions as conditions for determining the curbing action, the curbing action is determined according to a pattern of the action determination conditions to which the current situation corresponds, and the curbing actions control the electronic device to prohibit at least one of an image operation, display of an image, audio output, and audio input.

8. The inappropriate use control system of claim 7, wherein the processor is further configured to execute the instructions to determine the situation in which the image displayed on the electronic device is not viewed by the user.

9. The inappropriate use control system of claim 7, wherein the processor is further configured to execute the instructions to:

detect a direction of the user's face relative to the image displayed on the electronic device using at least one of the direction of the user's face in an image captured by an in-camera and the direction of the user's face detected by an infrared sensor; and determine the situation in which the image displayed on the electronic device is not viewed by the user using the direction of the user's face relative to the image displayed on the electronic device.

10. A non-transitory computer-readable storage medium storing an inappropriate use control program, which executes on a processor to cause the processor to perform a process comprising:

identifying at least one of action determination conditions corresponding to a current situation;

determining a curbing action corresponding to the action determination conditions corresponding to the current situation, the curbing action being an action for curbing a user's inappropriate use of an electronic device carried by the user and used by the user;

executing the determined curbing action; and permitting exceptional use of a specific function of the electronic device in a specific situation when executing the curbing action, the specific situation including at least one of a situation in which an image displayed on the electronic device is not viewed by the user and a situation in which the user is moving by train, wherein when the current situation corresponds to at least one of the action determination conditions as conditions for determining the curbing action, the curbing action is determined according to a pattern of the action determination conditions to which the current situation corresponds, and the curbing actions control the electronic device to prohibit at least one of an image operation, display of an image, audio output, and audio input.

11. The non-transitory computer-readable storage medium of claim 10, wherein the process further comprises determining the situation in which the image displayed on the electronic device is not viewed by the user.

12. The non-transitory computer-readable storage medium of claim 10, wherein the process further comprises:
- detecting a direction of the user's face relative to the image displayed on the electronic device using at least one of the direction of the user's face in an image captured by an in-camera and the direction of the user's face detected by an infrared sensor; and
- determining the situation in which the image displayed on the electronic device is not viewed by the user using the direction of the user's face relative to the image displayed on the electronic device.

* * * * *